US007721408B2

(12) United States Patent
Solazzi

(10) Patent No.: US 7,721,408 B2
(45) Date of Patent: May 25, 2010

(54) METHOD AND APPARATUS FOR COVERING A CONTAINER

(76) Inventor: Monte J. Solazzi, 2820 SW. 42nd Ave., Palm City, FL (US) 34990

( * ) Notice: Subject to any disclaimer, the term of this patent is extended or adjusted under 35 U.S.C. 154(b) by 231 days.

(21) Appl. No.: 11/521,043

(22) Filed: Sep. 14, 2006

(65) Prior Publication Data

US 2008/0072412 A1 Mar. 27, 2008

(51) Int. Cl.
*B21D 39/00* (2006.01)
*B23P 21/00* (2006.01)

(52) U.S. Cl. .......................................... 29/521; 29/775

(58) Field of Classification Search .................. 29/428, 29/521, 773, 775; 73/864.91, 863; 422/102
See application file for complete search history.

(56) References Cited

U.S. PATENT DOCUMENTS 3,508,380 A 4/1970 Nakamuro
6,009,766 A * 1/2000 Solazzi .................... 73/864.91
7,316,316 B2 * 1/2008 Lombardi et al. ........... 206/463

* cited by examiner

*Primary Examiner*—John C Hong
(74) *Attorney, Agent, or Firm*—Plevy & Keene LLP

(57) ABSTRACT

A method and apparatus for covering and identifying a container utilizing a thin film material and a frame. The thin film material covers a through hole in the frame and has a perforation that defines an outer detaching surface an inner covering surface commensurate with the container opening. The method comprises the steps of attaching the thin film material to a frame having the through hole; disposing the frame onto an open top surface of the container; depressing a portion of the frame to detach the thin-film from the frame along the perforation and further sliding the frame coaxially to circumscribe the base of the container where it identifies information about the container.

8 Claims, 4 Drawing Sheets

METHOD AND APPARATUS FOR COVERING A CONTAINER

FIELD OF THE INVENTION

This invention relates to an apparatus and a method for covering and identifying a variety of differently sized and shaped containers quickly and safely.

BACKGROUND OF THE INVENTION

A need exists for container covers that are easy to use and also serve important safety and environmental storage functions. For instance, many households keep a large variety of containers to store food which often require distinctive covers. It is of course understood that the container, which has a top opening to which food or some other item is placed, can be covered by many items. For example, the open top can be covered by a sheet of Mylar, which basically is sold under the trademark Saran Wrap. Such sheets or similar types of sheets are manufactured by various companies. However, it is also noted that it is difficult to work with these sheets. Such materials often come on a roll. The material then has to be removed from the roll at which time it may wrinkle and because of the nature of the material it may stick to itself, thus causing great difficulty in attempting to cover openings of various containers. Another prior art technique is to cover an open container with a wax paper so that food or other items will not stick to it. The waxed paper however, does not exhibit the same properties as a thin film of Mylar. Hence, if one covers the open top of a container with wax paper one might also employ a rubber band or other securing means to assure that the paper is secured to the container and covers the top opening. In a similar manner, one may cover the entire container with such a material and use an excessive amount of material in doing so. Hence, the use of Mylar film or Saran Wrap or other materials such as aluminum foil are not easy to work with and certainly not easy to measure in regard to covering items.

As indicated above, containers often come in various sizes, with covers of such containers also being of varying size. These container covers are not always handy because they are difficult to find among the equally large variety of corresponding covers and often stored in locations different from the mating container. In other situations a need exists to cover industrial product containers, such as paints or hazardous chemicals with covers that will later readily identify the respective contents. In yet other situations, consuming beverages in public places may require a safe and effective means to cap the container to guard against the increasing use of deleterious substances that may be added to a consumer's drink. For example, date-rape drugs have been employed to render an individual incapacitated and allow a predator to commit such heinous crimes as rape, robbery and so on. Potential victims are especially vulnerable in bars and nightclubs.

Each of the foregoing applications have efficiency, safety and identification in common. The present invention provides an improved apparatus and method for affixing a cover over a container opening, which cover permits efficient use, safe storage and identification of containers and the contents.

SUMMARY OF THE INVENTION

In one embodiment of the invention a method comprises the steps of: attaching a film-like material to a planar frame having a through hole whereby the film-like material covers the through hole and contains a perforation pattern that defines an outer detaching surface and an inner covering surface commensurate with a container opening; disposing the planar frame member onto an open top surface of the container such that the inner covering surface of the thin-film material extends across the open top surface; and depressing the planar frame member which detaches the film-like material from the frame along the perforation, and thereby causing increased tautness of the inner covering surface, which extends across the open top surface and after disposing the thin film material across the opening of the container, coaxially sliding the frame over the container where it serves to identify a feature of the container by virtue of its color, written matter or other graphics imprinted or embossed upon the frame.

Figure 1:
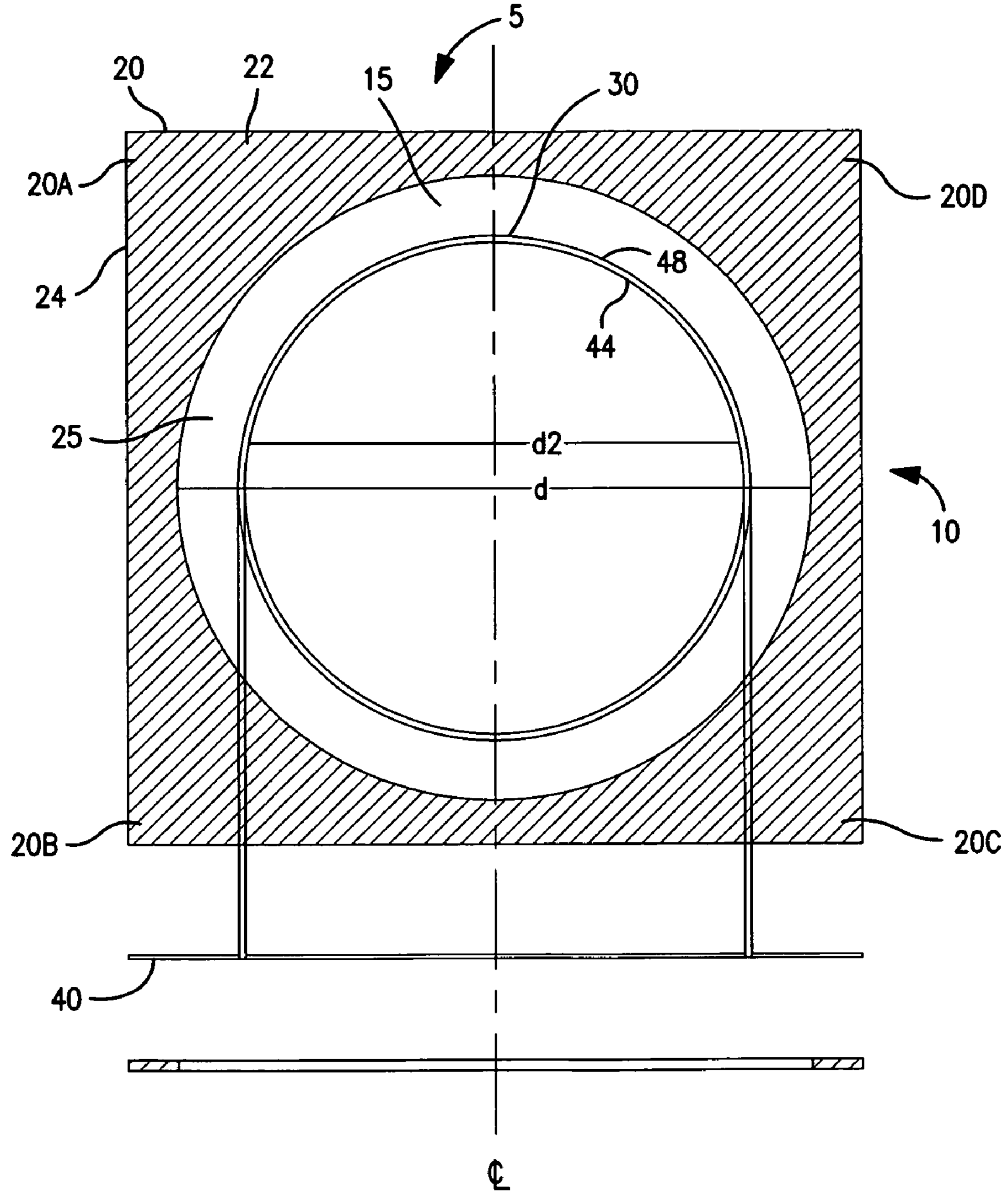
FIG. 1 is a top view of the apparatus used for affixing thin film material to a container according to an embodiment of the present invention.

It is to be understood that these drawings are solely for purposes of illustrating the concepts of the invention and are not drawn to scale. The embodiments shown herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE PREFERRED EMBODIMENTS

Referring now to FIG. 1, there is shown a preferred embodiment of an apparatus 5 used in conjunction with a container for placement of a thin film material 40 over an open surface of the container according to the present invention. The thin film material 40 is flexible and typically transparent, although there may exist applications where the thin film material may be required to be opaque. The apparatus 5 shown in FIG. 1 discloses a planar frame member 10 comprising a substrate 20 having a cavity or through hole 25. The substrate 20 is preferably shaped in the form of a square or rectangle and made of a substance of sufficient strength and durability to withstand a downward force necessary to disengage the thin film material 40 from substrate 20 as further described below, while being lightweight to facilitate handling and shipping. Such material may include plastic, paper, metal, or other materials having the above-mentioned properties. The substrate must also have material properties requisite for attaching thin film material 40 for covering the through hole 25. The structure shown in FIG. 1 is employed in U.S. Pat. No. 6,009,766 issued on Jan. 4, 2000, entitled "Apparatus and Methods for Affixing Thin Film Material to Sample Cup Used in X-Ray Spectroscopy", in the name of Monte J. Solazzi the inventor herein. In that patent there is shown a method for covering a sample cup for retaining a sample to be analyzed spectrochemically. The method consists of attaching a thin film material to a substrate having a through hole to form a planar frame member. The thin film material covering the through hole and having a pattern perforation positioned within the through hole defining an inner covering surface with diameter D1 and outer detaching surface. As one can see from FIG. 1 of that patent, it is the same as FIG. 1 of the present application. The method of affixing the thin film of material over the open surface of the sample cup is basically the same method employed herein. The thin film material as indicated in the '766 patent can be a polyester, polyamide, polycarbonate or a polypropylene. In any event, these substances are similar to a Mylar sheet material. It is understood that while the apparatus depicted in FIG. 1 is employed, it is totally unanticipated to utilize the apparatus for the present purposes. Furthermore, the needs of a sample cup are quite different than the need to cover a container containing perishables or liquids therein. As one can ascertain from the '766 patent there are many requirements regarding the tautness of the film and the way the film is applied to the sample cup which are not of consequence in regard to the present invention. In any event, the description of the present invention and the use of the present invention will be described below.

The through hole 25 is circular in shape, although other shapes may be employed as square, rectangular and so on, having a diameter d. The through hole 25 extends between the upper surface 22 and the lower surface 24 opposite surface 22 of substrate 20. The thin film material 40, such as by way of example and not limitation, polyester, polyamide, polycarbonate, polypropylene, and copolymers of vinylidene chloride and vinyl chloride (known under the trademark Saran a registered trademark of the Dow Chemical Company) is then disposed onto top surface 22 of substrate 20 in such a way that the thin film material 40 completely covers and extends across through hole 25. Note that the thin film 40 may also be disposed on and attached to bottom surface 24. It also will be recognized by those skilled in the art of laminated material handling that the top surface 22 and the lower surface 24 may comprise separate substrates between which the thin film material is sandwiched or interposed. Thin film 40 includes a perforated line or area 30, which is patterned in a predetermined configuration. In one non-limiting embodiment, the perforation comprises a circular perforation 30, although other configurations are contemplated for conformance with the geometry of the container to be used.

The circular perforation 30 thus divides the thin film 40 into an inner surface 44 and an outer surface 48. The inner surface covering 44 is thus defined as the region interior to circular perforation 30, while outer detaching surface 48 is defined as the region of thin film material 40 exterior to the perforation 30 line. In various embodiments the diameter d approaches coincidence with diameter d2. The geometry of the overall thin film material 40 may include a variety of shapes and sizes sufficient to cover the through hole. The thin film 40 has an overall diameter greater than the diameter of the through hole and diameter d2 defined by the circular perforation (and associated with inner surface covering region 44) which is less than the diameter d of the through hole. Thin film 40 is then disposed onto the surface of substrate 20 and extended so that the material is taut and so that the annular perforation 30 lies within the through hole as shown in FIG. 1. The annularly perforated thin film material is then attached to the top surface 22 of substrate 20, or in the case of separate substrates between which the thin film material is sandwiched or interposed, using conventional means such as an adhesive or adhesive bonding, ultrasonic bonding, or mechanically coupling the material to the substrate or substrates as the case may be.

Figure 2A:
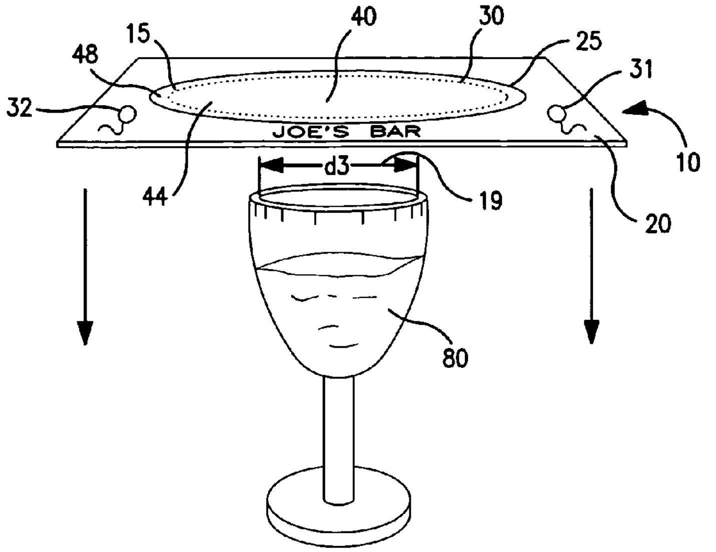
FIGS. 2A-2C illustrate steps for using the apparatus to attach the covering to a container according to embodiments of the present invention.
Figure 2B:
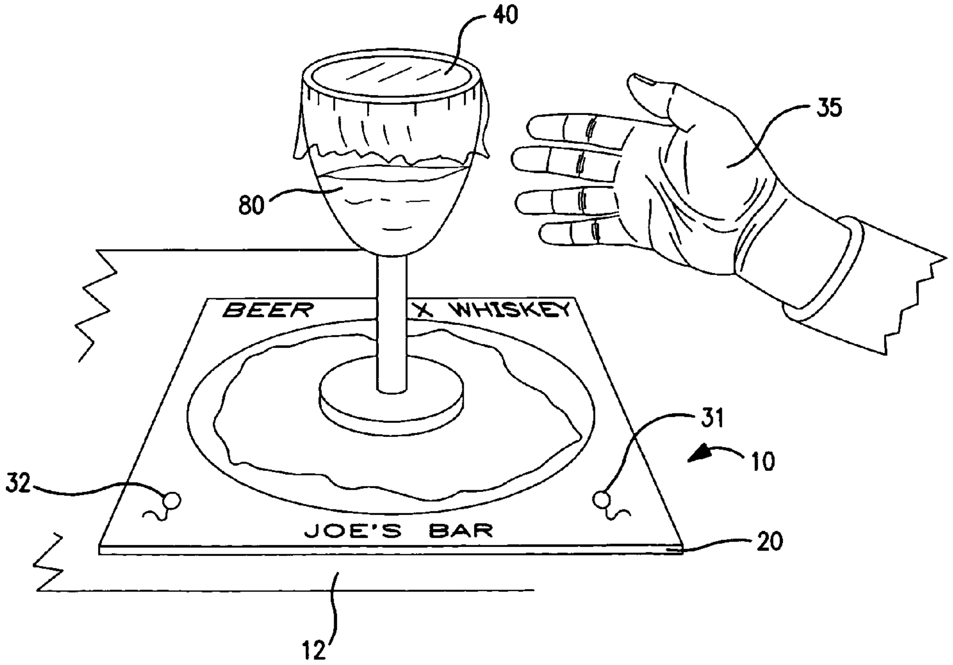

As shown in FIG. 2A, container 80 is shown as a cocktail glass. Such glass typically has a stem and a base. The frame 10 as seen is positioned over the opening of the glass and the frame has indicia printed thereon. By way of example, the frame and film may be utilized by a bar or other establishment serving drinks. When the user desires to momentarily leave, such as to take a phone call or otherwise leave the bar, he utilizes the frame and film to cover the open top of the drink contained with the cocktail glass 80. If one attempts to insert a substance into the glass, one would have to remove the thin film covering and this would be apparent to anyone at the bar (or afterward, as the film would appear to have been tampered with) thus preventing such an event from occurring. It is also seen that the periphery of the frame may indicate the name of the establishment such as "Joe's Bar" and may also have identifying marking indicia as 31 and 32. These are shown as balloons but any device or apparatus can be depicted. The indicia imprinted on the frame may be of different colors or different indicia in order to distinguish one drink from another. As seen in FIG. 2B, as the frame is pushed downward, as depicted by the arrows in FIG. 2A, it surrounds the base of the glass thereby serving as a marker for the person whose drink it is. This marker enables the person to return to the location and continue with his or her drink while uncovering the same. Furthermore, if the frame is a substrate 20 made of a fairly rigid material with a thicker film area 40 the device can be utilized as a coaster. In this manner the base of the drink would be placed in a central area. If the sheet is thick enough there would be minimal damage to the perforated area when the drink is still in place. The person whose drink it is can then place the film 40 over the glass when leaving the bar temporarily or for any desired period. The film and the frame in the particular application depicted in FIGS. 2A and 2B, serves multiple purposes. For example, the frame together with the inner sheet can be utilized as a coaster where a patron of a bar can place the glass on the central portion of the film 40. It can be used as a cover for the drink as shown in FIG. 2B to prevent the accidental or intentional insertion of substances in the drink while unattended. The frame can also serve as a locator for a particular drink. For example the person would know that the frame associated with his drink would have red balloons as 31 and 32, or other specific indicia as distinguished from other drinks. Furthermore, the frame also serves as an advertising media for the particular establishment or for a particular beverage and can have any indicia imprinted thereon, thus serving as an advertising media. As indicated, the frame can include indicia representative of a trademarked item, another establishment, and various other advertising indicia. The frame can be of different colors indicative of different drinks or contain any indicia such as numbers and so on.

Figure 2C:
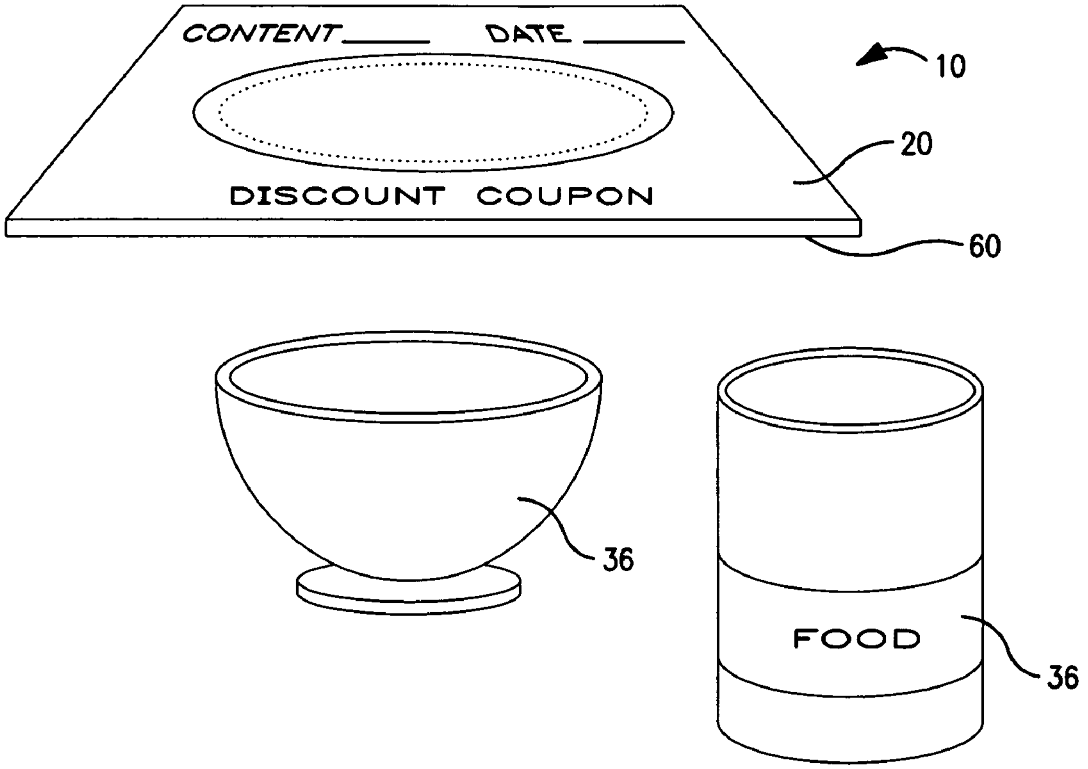

Referring now to FIGS. 2A-2C, the frame 10 is centrally placed over a container 80 having an open top surface 19 and a hollow 18 interior to the container 80 for receiving and retaining a volume of a substance. As shown in FIG. 2A, the open surface 19 of the glass or container 80 is of circular configuration and has a diameter d3 which is less than the diameter d2 associated with the inner coverage surface region 44 of the thin film material 40. The frame member 10 is then centrally placed over the container 80 such that the inner covering surface 44 extends over and across the open surface 19 of the container 80, while the perforation 30 extends beyond the diameter of the open surface.

By applying a small amount of force to the top surface planar frame member 10 in a downward direction and preferably to the four opposite end regions (20A-D, FIG. 1) of the substrate 10, in a substantially even manner, a portion of the thin film 40 having inner surface 44 detaches and separates from outer surface 48 and produces annularly shaped thin-film portion 15 along the pattern perforation. The force increases the tautness of the inner covering surface region 19 extending across the open top surface of the container 80. Alternatively, application and adherence of the thin film material 40 to the container 80 surface may be accomplished by a substantially even depression of only two regions of the substrate (e.g. 20A and 20C, FIG. 1) opposite one another and displaced along a diagonal.

The perforation 30 diameter is substantially collinear with the rim as defined by open surface 19 of the container 80, such that as the substrate frame 10 is depressed, the thin film 40 stretches across the opening diameter d3 and detaches leaving the thin film portion 15 extending approximately from the frame 10 through hole 25 perimeter to the perimeter of the open surface 19. The frame 10 that contains thin-film portion 15 loosely fits to the perimeter of the opening d3 and for a container in the shape of a right cylinder (such as a conventional pint sized paint can or drinking glass) upon the application of a downward pressure the frame 10 through flexure of thin-film portion 15 overcomes any impediment surrounding the opening as defined by open surface 19 and through friction between the frame opening and the container 80 side contacts the side of the container 80. As shown in FIG. 2B, further pressure on the frame 10 coaxially slides the frame 10 through a loose interference fit occurring between the frame 10 and associated thin-film portion 15. At the bottom of the container 80 the frame rests on surface 12 circumscribing the container and thus associating container 80 to an identification of its contents.

The radial dimension of the thin-film portion 15 may be established as close to the frame 10 through hole perimeter as desired to increase the fit between the container 80 and the frame 10. In a variety of metal containers that are manufactured through a drawing process or a process of affixing to a base to the container one of a rim, lip or boss 81 (FIG. 2A-B,) the frame 10 circumscribes the base of the container 80, which further supports and insures that the frame 10 remains affixed to the container 80 as shown in FIG. 2B.

In one embodiment, the perforation 30 diameter is larger than the rim of the container 80, such that as the frame 10 is depressed the thin film 44 detaches from the thin film 40 leaving the covering thin film 44 portion larger than the diameter of the opening d3. The thin film 44 in excess of the diameter of the opening diameter d3 grips the side of the container 80. As described above, further pressure on the frame 10 coaxially slides the frame 10 through a loose interference fit occurring between the frame 10 and associated thin-film portion 15. At the bottom of the container 80 the frame rests on surface 12 circumscribing the container and thus associating container 80 to an identification of its contents.

Alternatively, the apparatus may be applied to the container 80 with the aid of a snap-on ring or other method of thin film attachment as depicted in FIG. 2B of U.S. Pat. No. 6,009,766 referenced above. As shown in FIG. 2B there is a person's hand 35. In this manner after utilizing the frame and thin film associated with the frame because of the drink the person can then run his hand or finger about the excess material disposed about the body of the glass and secure it firmly. This can be done in a simple manner. It is further noted that there is no particular requirement for the material to be as taut as for example a material which would be place over a sample cup used in X-Ray Spectroscopy. The main objective of the present invention is to utilize the frame and thin film to cover various containers and to assure that the contents of the containers will not spill while eliminating the need to deal with material such as found commercially, which materials tend to statically adhere to one's fingers and to also adhere to itself, resulting in unnecessary folds and difficulty in placing the same as experience will indicate to one. This is an efficient way of providing a consumer with a material such as saran wrap or other transparent or opaque material to cover the opening of a container without undo fuss and without excessive manipulation of the film or covering material.

From the above discussion, it can be seen that the above apparatus and method provides for a thin film cover over the container. The above application also eliminates electrostatic charges associated with the handling of thin films, since any movement or centering of the film may be accomplished by grasping the substrate portion of the frame 10 rather than the film, thereby eliminating contact with the film material.

Referring to FIG. 2C there is shown various containers such as a bowl 36 having an opening. The bowl 36 could accommodate practically any item including food, to be placed in a refrigerator or elsewhere. The open top of the bowl 36 would be covered by utilizing the frame 20 and the film apparatus. As seen in FIG. 2C the frame 20 can contain data indicative of the contents of the bowl 36 as well as the date the contents were placed in the bowl or any other indications that the consumer may desire to include. The frame 20 can also contain advertisements of various foods or can also act as a coupon. Thus, the frame 20 after employed may be brought back to a supermarket or other place as the frame can be used as a discount coupon or for other advertising purposes. FIG. 2C also shows a generic cylindrical container 36 which also may contain food or any other item which also can be covered by the apparatus depicted. It is understood that various other items can be employed. It is understood that the frame and associated film can be made in various sizes. The frames are stacked and placed in a suitable box or other container and are very easy to use. It is also indicated that the frame can also have an adhesive as 60 applied to the bottom surface which adhesive can be covered by a removable coating as is well known. The adhesive can also be the type of adhesive used on paper notes and will enable the frame for example to be placed on the container, as for example, wrapped around the periphery of the container or secured thereto. The frame thus secured can serve to identify any contents placed in a container. As one can see, there are many multiple uses for the apparatus depicted.

Figure 3:
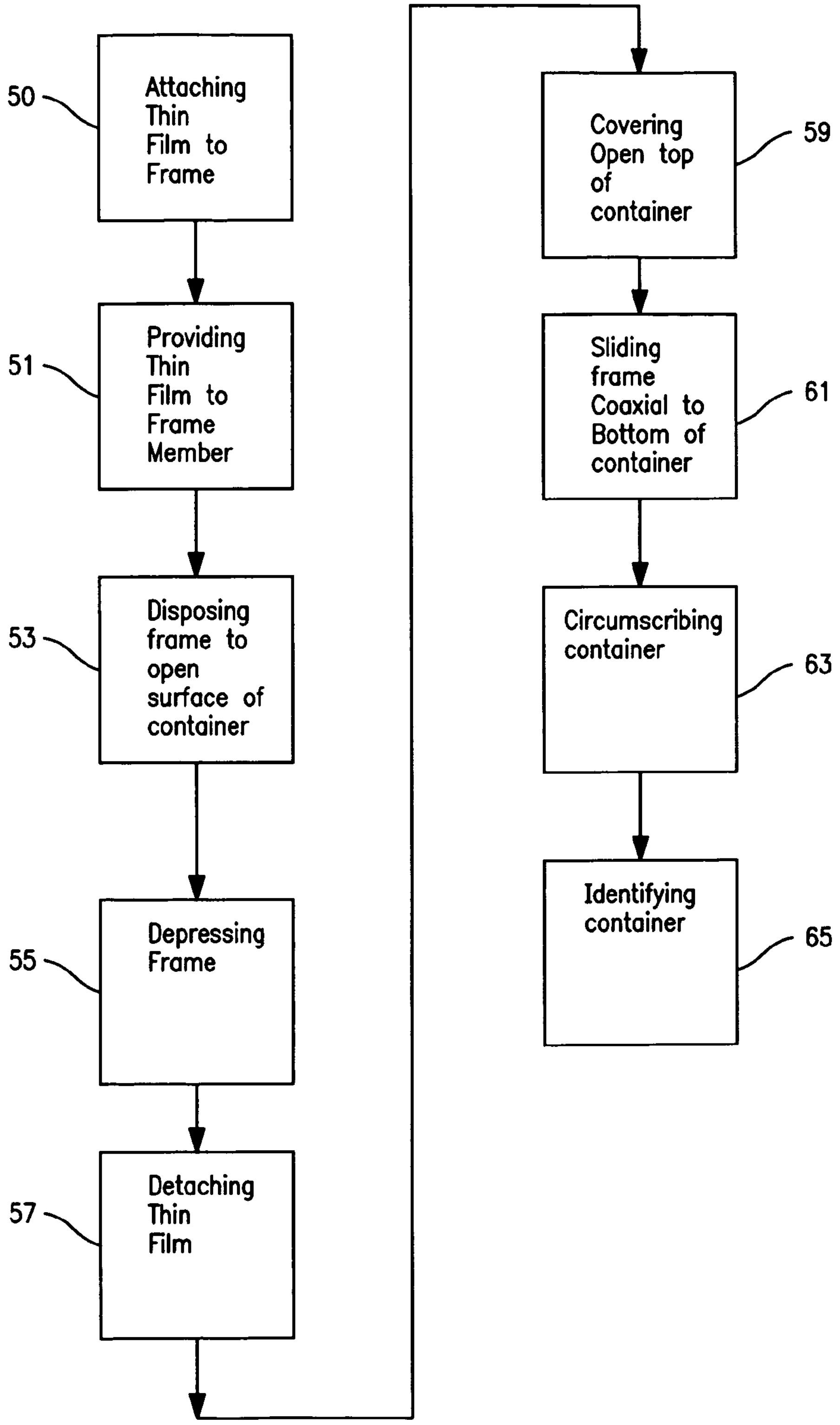
FIG. 3 is a flow diagram of a method for covering and identifying a container in FIGS. 2A-2B according to an embodiment of the present invention.

As illustrated in FIG. 3, an embodiment of the invention includes a method of covering the open end 19 of container 80, comprising the steps of: attaching 50 a thin film to a frame; providing 51 a planar frame member 10 having a through hole 25 with a thin film material secured to the planar frame member 10 and covering said through hole; said thin film material having a perforated line 30 of weakness defining a thin film inner region situated within said through hole; disposing 53 the planar frame 10 onto the open top surface 19 of the container 80 with diameter d2 less than d such that the inner covering surface of the thin-film material extends across the open top surface 19; depressing 55 a portion of the planar frame member; detaching 57 the film material from the planar frame 10 along the patterned perforation; covering 59 the open top surface 19 of the container 80; sliding 61 the planar frame 10 coaxial to the base of the container 80; circumscribing 63 the container at the base utilizing the planar frame; and identifying 65 the planar frame 10 by displaying information salient to the contents of the container 80 such as its contained substance.

It will be understood that the present invention apparatus affixing this film to containers described herein are exemplary and that a person skilled in the art may make many variations and modifications to the described embodiment utilizing functionally equivalent components to those described. As such, variations and modifications, including differing physical geometries, proportions and materials are intended to be included within the scope of the invention as defined in the appended claims.

What is claimed is:

1. A method of covering an open end of a container comprising the steps of:

attaching a film material to a planar frame having a through hole whereby the film material covers the through hole and contains a perforation pattern substantially defining an outer detaching surface and an inner covering surface commensurate with the open end;

disposing the planar frame member onto the open end of the container;

depressing the planar frame member thereby detaching the film material from the frame along the perforation and covering the open end of the container;

coaxially sliding the frame to the base of the container, wherein said frame includes at least one indicia for identifying at least the container;

smoothing said film material over an external surface of said container; and retaining said planar frame in a position substantially centered about said container to mark a location of said container.

2. The method of claim 1, further including the step of circumscribing the base of the container.

3. The method of claim 1, wherein said at least one indicia includes utilizing one or more of the group consisting of color, written matter or graphics imprinted or embossed upon the frame.

4. The method of claim 1, wherein said film is thinner in thickness than said frame.

5. The method of claim 1, wherein said indicia is indicative of at least one of: an establishment serving the fluid to be consumed, the manufacturer of the fluid, the type of fluid and identification of the user.

6. A method of covering an open end of a container comprising the steps of:

providing a planar frame member having a through bole with a thin film material secured to the planar frame member and covering said through hole, said thin film material having a perforated line of weakness defining a thin film inner region situated within said through hole;

disposing the planar frame onto the open top surface of the container such that the inner covering surface of the thin-film material extends across the open top surface;

depressing a portion of the planar frame member;

detaching the film material from the planar frame along the patterned perforation, thereby causing increased tautness of the inner covering surface which extends across the open top surface securing the edge of the container;

sliding the planar frame to the base of the container, wherein said frame includes at least one indicia identifying the container utilizing the planar frame and a position of said container;

smoothing said film material over an external surface of said container; and retaining said planar frame in a position substantially centered about said container to mark a location of said container.

7. An apparatus for identifying a container and covering an open end of the container comprising:

a substrate having a through hole, said substrate including an indicia for identifying a feature associated with said container to a user of said container;

a flexible thin film material bonded to said substrate and covering said through hole, said thin film materiel having a perforated line of weakness defining a thin film inner region situated within said through hole, wherein a pressure applied to the thin film separates the thin film from the substrate at the perforation allowing the thin film material to cover an open end of a container, and the substrate to be positioned substantially centered about the bottom of the container to identify a feature associated with said container.

8. The apparatus of claim 7, wherein said thin film material is selected from the group consisting of polyester, polyamide, polycarbonate, polypropylene, and copolymers of vinylidene chloride and vinyl chloride.

* * * * *